United States Patent
Steinberg

(10) Patent No.: US 11,936,152 B2
(45) Date of Patent: Mar. 19, 2024

(54) PRODUCTION OF A PLANAR CONNECTION BETWEEN AN ELECTRICAL CONDUCTOR AND A CONTACT PIECE

(71) Applicant: NEXANS, Courbevoie (FR)

(72) Inventor: Helmut Steinberg, Floss (DE)

(73) Assignee: NEXANS, Courbevoie (FR)

( * ) Notice: Subject to any disclaimer, the term of this patent is extended or adjusted under 35 U.S.C. 154(b) by 329 days.

(21) Appl. No.: 16/937,082

(22) Filed: Jul. 23, 2020

(65) Prior Publication Data
US 2021/0044066 A1 Feb. 11, 2021

(30) Foreign Application Priority Data
Jul. 26, 2019 (EP) ................................. 19305980

(51) Int. Cl.
| | | |
|---|---|---|
| *H01R 4/02* | (2006.01) | |
| *B23K 20/12* | (2006.01) | |
| *H01R 43/02* | (2006.01) | |
| *B23K 101/38* | (2006.01) | |
| *B23K 103/10* | (2006.01) | |
| *B23K 103/12* | (2006.01) | |
| *H01R 4/58* | (2006.01) | |

(52) U.S. Cl.
CPC ........... *H01R 43/02* (2013.01); *B23K 20/122* (2013.01); *H01R 4/029* (2013.01); *B23K 2101/38* (2018.08); *B23K 2103/10* (2018.08); *B23K 2103/12* (2018.08); *H01R 4/58* (2013.01)

(58) Field of Classification Search
CPC ........... H01R 4/02; H01R 4/023; H01R 4/029
See application file for complete search history.

(56) References Cited

U.S. PATENT DOCUMENTS

| | | | |
|---|---|---|---|
| 10,583,519 B2 * | 3/2020 | Litwinski | B23K 20/1265 |
| 11,101,576 B2 * | 8/2021 | Hauck | H01R 4/625 |
| 11,394,131 B2 * | 7/2022 | Scharkowski | H01R 43/0214 |
| 2014/0144015 A1 | 5/2014 | Mayer et al. | |
| 2016/0199932 A1 * | 7/2016 | Kern | H01R 4/187 |
| | | | 439/874 |
| 2017/0338573 A1 * | 11/2017 | Turner | H01R 11/11 |
| 2020/0028279 A1 * | 1/2020 | Hauck | B23K 20/122 |

FOREIGN PATENT DOCUMENTS

JP    2004 160477    6/2004

OTHER PUBLICATIONS

EU Search Report dated Jan. 27, 2020.

* cited by examiner

*Primary Examiner* — Chau N Nguyen
(74) *Attorney, Agent, or Firm* — Sofer & Haroun, LLP

(57) ABSTRACT

A method is provided for electrically conductively connecting a contact part to a conductor having a multiplicity of individual wires includes inserting the conductor into a cavity in the contact part and lowering a tool for friction stir welding onto the contact part. The tool for friction stir welding is moved on the contact part in a plane, thus giving rise to a planar cohesive connection between the contact part and the conductor. In this way, a direct cohesive connection of a stranded conductor and a contact part is produced without the need for an additional part such as a sleeve, for example, to prevent the stranded conductor from "sticking out".

8 Claims, 1 Drawing Sheet

PRODUCTION OF A PLANAR CONNECTION BETWEEN AN ELECTRICAL CONDUCTOR AND A CONTACT PIECE

RELATED APPLICATION

This application claims the benefit of priority from European Patent Application No. 19 305 980.5, filed on Jul. 26, 2019, the entirety of which is incorporated by reference.

FIELD

The invention relates to a method for electrically conductively connecting a contact part to a conductor, and also an electrical conductor produced according to this method. The method concerns, in particular, conductors composed of aluminium or an aluminium alloy which are embodied as stranded conductors.

BACKGROUND

Conductors composed of aluminium are increasingly being used as a replacement for copper conductors, particularly for weight and cost reasons. Principal fields of use of such conductors are automotive engineering and aircraft engineering, for example. The lower electrical conductivity of aluminium compared with copper is unimportant for most applications. Problems arise, however, when attaching contact parts to the conductors, since aluminium conductors are surrounded by an oxide layer having very poor electrical conductivity. This deficiency becomes apparent particularly in the case of conductors consisting of a multiplicity of individual wires, also referred to as stranded conductors. The individual wires are surrounded by an oxide layer, which is unavoidable without special treatment. This problem area has been known for a long time. Electrical lines comprising such a conductor, which is expediently surrounded by a sheath composed of insulating material, are frequently installed in the field of vehicles. In order to be able to install such lines effectively and in a time-saving manner in production, the ends of the lines are provided with electrical contact parts, also referred to as a "terminal".

The copper- or aluminium-based contact part consists of copper or of a copper alloy, or respectively of aluminium or of an aluminium alloy. It may additionally have a layer of tin, zinc or nickel, for example, on its outer surface, said layer being applied by electrodeposition, for example. The contact part is referred to hereinafter without indication of material just as "contact part".

The individual wires of the conductor consist either of aluminium or of an aluminium alloy. For the sake of simplicity, just the term "aluminium" is used hereinafter to denote both aluminium and alloys thereof.

EP 2 735 397 A1 discloses for example a method in which a cup-shaped contact part is pushed onto a stranded conductor. The contact part is provided with different terminal elements depending on the application. The contact part is produced as an integral component by deep drawing and is cohesively connected to the conductor by friction stir welding.

Known friction spot stir welding involves producing an end face connection between a stranded conductor and a contact part. In order that the strands do not stick out during the welding process, they have to be guided or pressed or crimped in a sleeve. Consequently, in the course of the connection between the stranded conductor and the contact part, the sleeve additionally has to be provided as a component. Moreover, an additional work step is necessary before welding.

Taking this as a departure point, the object of the present invention is to provide a method for overcoming or at least improving one or more of the problems mentioned in the introduction.

SUMMARY OF THE INVENTION

In order to achieve this object, the invention according to a first aspect proposes a method for electrically conductively connecting a contact part to a conductor comprising a multiplicity of individual wires. The method comprises the steps of
 inserting the conductor into a cavity in the contact part;
 lowering a tool for friction stir welding onto the contact part;
 moving the tool for friction stir welding on the contact part in a plane, thus giving rise to a planar cohesive connection between the contact part and the conductor.

In the method, the tool, after "descending", travels a distance along the stranded conductor, from which insulation has been stripped, and thereby brings about planar friction stir welding. In this way, a direct cohesive connection of a stranded conductor and a contact part is produced without an additional part, such as the sleeve mentioned, to prevent the stranded conductor from "sticking out". The cavity expediently has a shape that is complementary to the shape of the conductor from which insulation has been stripped.

In one particularly advantageous embodiment of the method according to the invention, the individual wires of the conductor are also cohesively connected to one another. What is achieved in this way is that all the individual strands of the conductor participate uniformly in current transport.

The planar cohesive connection produces a sufficient transverse conductivity between the individual strands and also a metallurgical connection to the contact part. The transverse conductivity between the individual strands is of importance particularly in the case of aluminium conductors because the individual strands are coated with an insulating oxide layer. In the case of deficient transverse conductivity, i.e. if not all of the individual strands are contacted, the cross section of the conductor is not optimally utilized for current transport, as a result of which problems may arise during continuous operation of the line.

The contact part is typically a solid part, for example a busbar such as is used for example in electric vehicles or vehicles having a hybrid drive.

The method according to the invention thus proposes a robust cost-effective welding method which is readily automatable and requires no additional parts such as the sleeve mentioned, for example.

In one exemplary embodiment of the method, moving the tool for friction stir welding is effected in a plane that is substantially perpendicular to a direction in which lowering the tool is carried out.

Advantageously, moving the tool can be effected translationally along a line. This embodiment is suitable particularly if the diameter of the tool for friction stir welding is greater than the diameter of the conductor that is welded to the contact part.

In another exemplary embodiment, moving the tool for friction stir welding is embodied as a two-dimensional movement. The two-dimensional movement is effected in a plane that is substantially perpendicular to a direction in which lowering the tool is carried out. The two-dimensional movement enables a planar cohesive connection between the conductor and the contact part even if the diameter of the tool for friction stir welding is less than the diameter of the conductor to be welded.

Expediently, the two-dimensional movement of the tool for friction stir welding can be effected translationally along an X-Y contour.

As an alternative thereto, the two-dimensional movement of the tool for friction stir welding can be composed of a superimposition of a translational and circular movement.

According to a second aspect, the invention proposes an electrical line comprising a conductor, which has a multiplicity of individual wires and which is connected to a contact part. The individual wires of the conductor are connected among one another and to the contact part by a planar cohesive connection produced by friction stir welding.

In one exemplary embodiment, the contact part of the electrical line is produced on the basis of copper or aluminium or an alloy thereof.

In one embodiment of the electrical line, the contact part is embodied as a busbar.

BRIEF DESCRIPTION OF THE DRAWING

The invention is explained in greater detail by way of example below on the basis of an embodiment with reference to the accompanying figures. All the figures are purely schematic and not to scale. In the figures.

Identical or similar elements are provided with identical or similar reference signs in the figures.

DETAILED DESCRIPTION

Figure 1:
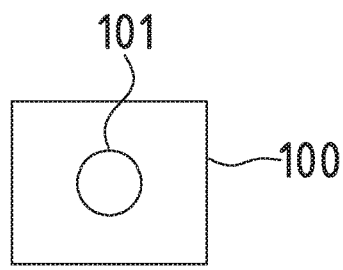
FIG. 1 shows a plan view of an end side of a solid contact part.

FIG. 1 schematically shows a plan view of an end side of a contact part 100 embodied as a solid component. The contact part 100 has a cavity 101, which serves for receiving an electrical conductor, as will be described further below. The cavity 101 is embodied as a blind hole, for example, the way in which the cavity is produced not being of importance in association with the invention. Besides other machining production methods, the cavity can also be produced by forming of the contact part or, if the contact part is a cast part, during the casting of the contact part. The cavity can also be embodied as a groove.

In one exemplary embodiment, the contact part 100 has securing means (not illustrated) used to connect the contact part to an electrical battery or an electrical machine, for example. In the simplest case, the securing means are screw holes into which a corresponding securing screw is inserted.

Figure 2:
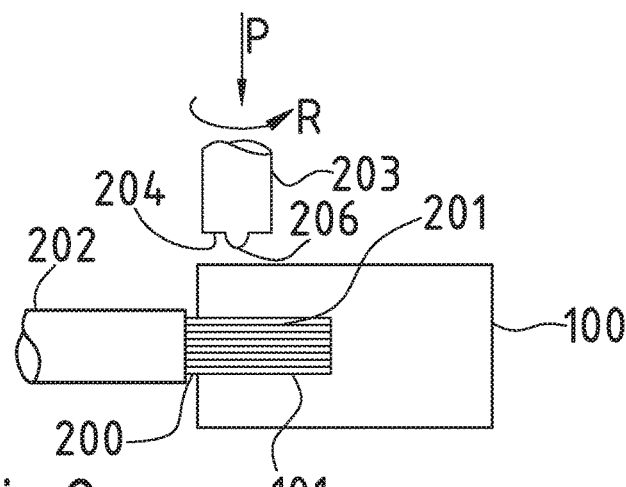
FIG. 2 shows a cross section through the contact part from FIG. 1 with an inserted conductor.

FIG. 2 shows the contact part from FIG. 1 in a cross section with a conductor 200 inserted into the cavity 101 of the contact part 100. The conductor 200 is produced from a multiplicity of individual wires or individual strands which are twisted and/or stranded together and form a stranded conductor. The conductor 200 is surrounded with an insulating sheath 202. The individual strands 201 consist of aluminium or an aluminium alloy. Since aluminium and its alloys readily oxidize and become coated with an insulating oxide layer, during practical use of stranded conductors composed of aluminium it is of great importance for all the individual strands 201 to be contacted in order that the cross section of the conductor 200 is utilized as well as possible for current transport. The insulating sheath 202 is removed at an end of the conductor 200 which is inserted into the cavity 101 of the contact part 100. As is evident from FIG. 2, the diameter of the cavity 101 is dimensioned such that the conductor 200 is able to be inserted into the cavity without the individual strands 201 "sticking out", i.e. without individual or a plurality of individual strands 201 not being received in the cavity 101 but rather jutting outwards.

The electrical connection between the contact part 100 and the conductor 200 is produced by a planar cohesive connection which firstly produces a metallurgical connection between the conductor 200 or the stranded conductors 201 and the contact piece 100 and secondly produces at the same time a metallurgical connection between the individual stranded conductors 201. A good transverse conductivity is produced in this way, such that all the individual strands 201 contribute to current transport and the cross section of the conductor 200 is utilized optimally for current transport.

According to the invention, the planar cohesive connection is produced by friction stir welding. In this welding method, the temperature required for a weld is generated by friction. In this case, the material of the contact part 100 bonds to the stranded conductor 200 cohesively at a temperature below the melting point of the metals used or they are welded together by diffusion. Contributions to this are also made by the pressure applied by the tool 203, and the deformation work performed as a result. The tool used in the method accordingly has a friction surface 204, the efficacy of which is improved by a projecting tip 206 arranged centrally. In order to produce the connection, the rapidly rotating tool 203 is lowered onto the contact part 100. In FIG. 2, the rotation of the tool 203 is indicated by an arrow R, and the lowering movement by an arrow P. The tool 203 exerts pressure on the contact part 100, which pressure together with the rotational movement causes the material of the contact part 100 and the individual strands 201 to convert to a plastic state and to enter into a metallurgical cohesive connection among one another.

When the tool 203 is placed against the contact part 100, it has advantageously already been caused to rotate. However, it can also be caused to rotate only after it has been placed against the contact part.

Merely lowering the rotating tool 203 only results in a spot weld, however, which is insufficient for high-voltage and/or high-current applications such as are present in the case of electric vehicles, for example.

Figure 3A:
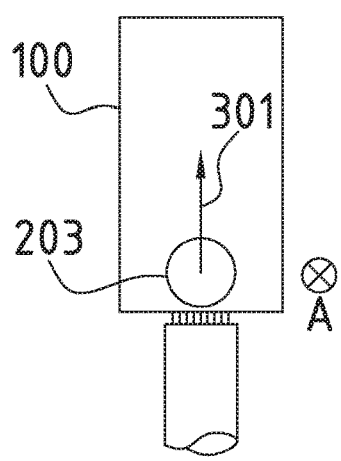
FIG. 3A shows a first plan view of the contact part with the inserted conductor from FIG. 2.

FIG. 3A illustrates how a planar connection between the conductor 200 and the contact part 100 is achieved. For this purpose, the tool 203, the diameter of which approximately corresponds to or is greater than the diameter of the conductor 200, is moved onto the contact part 100 along the arrow 301. This gives rise to a planar welding connection by way of friction stir welding with the advantages mentioned in the introduction. The area of the weld approximately corresponds to the diameter of the tool 203 in one direction and to the length of the arrow 301 in the other direction.

Figure 3B:
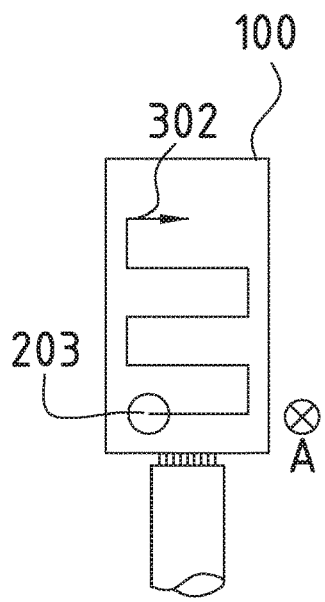
FIG. 3B shows a second plan view of the contact part with the inserted conductor from FIG. 2.

FIG. 3B illustrates an alternative procedure for producing the planar connection between the contact part 100 and the conductor 200. In accordance with the alternative procedure, the tool 203, the diameter of which is less than the diameter of the conductor 200, is moved along an X-Y contour, wherein a planar cohesive welding connection is once again produced by friction stir welding. The X-Y contour is indicated by an arrow 302 in FIG. 3B. This alternative method is advantageous particularly if the conductor 200 has a comparatively large diameter.

Figure 3C:
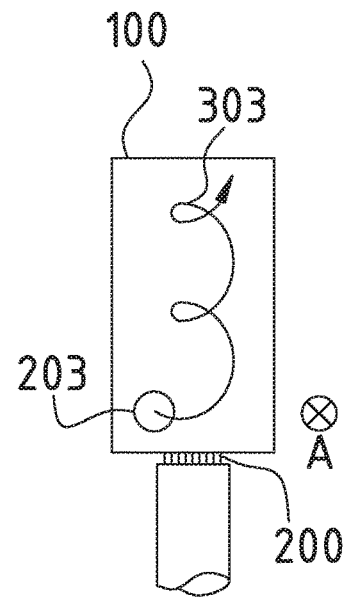
FIG. 3C shows a third plan view of the contact part with the inserted conductor from FIG. 2.

Finally, FIG. 3C shows a further method for producing the planar cohesive connection between the contact part 100 and the conductor 200. In this case, the tool 203 is moved on a cycloid along the conductor 200 inserted into the contact part 100. The cycloid arises as a result of the superimposition of a translational movement with a circular movement and is symbolized by the arrow 303 in FIG. 3C. This method, too, is suitable for conductors 200 having a comparatively large diameter.

In other embodiments, the tool executes other movement patterns, for example a zigzag line, on the contact part 100. In further embodiments, the tool 203 executes movement patterns on the contact part 100 which are produced from a combination of the movement patterns described.

The direction in which the tool 203 is lowered is symbolized by an arrow A into the plane of the drawing in FIGS. 3A to 3C. Accordingly, the tool 203 executes a movement towards the contact part 100 in the plane of the drawing.

In all the methods for producing the planar cohesive connection illustrated in FIGS. 3A to 3C, the tool 203 is raised from the contact part 100 when the tool 203 has moved a little way beyond the end of the conductor 200 situated in the cavity 101. As a result, the conductor 200 is cohesively connected to the contact part 100 over its entire length situated in the cavity 101.

Figure 4:
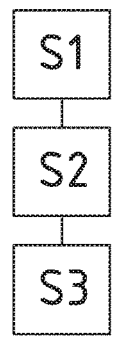
FIG. 4 shows a flow diagram of the method according to the invention.

FIG. 4 shows a flow diagram of the method for producing a planar cohesive connection in a general form. In a first step S1, the conductor 200 is inserted into the cavity 101 in the contact part 100. Then, in a step S2, the tool 203 for friction stir welding is lowered onto the contact part 100 and caused to rotate if it was not already rotating prior to being lowered. Finally, in a step S3, the lowered tool 203 is moved on the contact part 100 in a plane that extends substantially perpendicular to the direction in which lowering the tool 203 is carried out. In this last step S3, the individual strands 201 of the conductor 200 are cohesively connected to one another and to the contact part 100, thus giving rise to a planar cohesive connection.

LIST OF REFERENCE SIGNS

100 Contact part
101 Cavity
200 Conductor
201 Individual strands
202 Insulating sheath
203 Tool
204 Friction surface
206 Lug
301 Direction of movement
302 Direction of movement
303 Direction of movement

The invention claimed is:

1. An electrical line comprising:
a conductor, that has a multiplicity of individual wires, and which is connected to a contact part,
wherein the individual wires of the conductor are connected among one another and to the contact part by a planar cohesive connection produced by friction stir welding that includes
inserting the conductor into a cavity in the contact part;
lowering a rotating tool for friction stir welding onto the contact part;
moving the tool for friction stir welding on the contact part, in addition to its rotation movement, in two dimensions that form a plane, thus giving rise to said planar cohesive connection between the contact part and the conductor, wherein an area of the planar cohesive connection corresponds to an area covered by the movement of the rotating tool in two dimensions,
wherein said individual wires of the conductor are connected to the contact part without a sleeve.

2. The electrical line as claimed in claim 1, wherein said method further comprises the step of
cohesively connecting the individual wires of the conductor to one another.

3. The electrical line as claimed in claim 1, wherein moving the tool for friction stir welding is affected in a plane that is substantially perpendicular to a direction in which lowering the tool is carried out.

4. The electrical line as claimed in claim 1, wherein moving the tool for friction stir welding is a two-dimensional movement that is affected in a plane that is substantially perpendicular to a direction in which lowering the tool is carried out.

5. The electrical line as claimed in claim 4, wherein the two-dimensional movement of the tool for friction stir welding is affected translationally along an X-Y contour.

6. The electrical line as claimed in claim 4, wherein the two-dimensional movement of the tool for friction stir welding is composed of a superimposition of a translational and circular movement.

7. The electrical line according to claim 1, wherein the contact part is produced on the basis of copper, or aluminium, or an alloy thereof.

8. The electrical line according to claim 1, wherein the contact part is a busbar.

* * * * *